United States Patent [19]
Fleury

[11] Patent Number: 5,688,393
[45] Date of Patent: Nov. 18, 1997

[54] METHOD FOR THE ELECTRO-OXIDATION OF PHOTOGRAPHIC SOLUTIONS

[75] Inventor: Isabelle Fleury, Chalon sur Saone, France

[73] Assignee: Eastman Kodak Company, Rochester, N.Y.

[21] Appl. No.: 629,861

[22] Filed: Apr. 9, 1996

[30] Foreign Application Priority Data

Apr. 19, 1995 [FR] France ................... 95 04942

[51] Int. Cl.⁶ .................................................. C02F 1/46
[52] U.S. Cl. ..................... 205/744; 205/751; 205/760
[58] Field of Search ....................... 205/742, 744, 205/751, 752, 759, 760; 210/748

[56] References Cited

U.S. PATENT DOCUMENTS 3,998,710  12/1976  Itai et al. ................... 204/130
4,046,655  9/1977   Itai et al. ................... 204/149
5,160,417  11/1992  Neale ........................ 204/130
5,277,775  1/1994   Neale ........................ 204/269
5,543,030  8/1996   Shiramizn et al. .......... 205/464

*Primary Examiner*—Kathryn L. Gorgos
*Assistant Examiner*—William T. Leader
*Attorney, Agent, or Firm*—John R. Everett

[57] ABSTRACT

The invention concerns a method for the treatment by electrolysis of used photographic solutions, in particular those containing developers for X-ray films, in an electrolysis cell comprising at least one platinum anode and at least one cathode. According to the invention, a current density profile is used, and the current density at the start of electrolysis does not exceed 50% of the maximum density of the electrolysis current. The invention enables the quantity of foam formed during electrolysis to be reduced.

8 Claims, 6 Drawing Sheets

METHOD FOR THE ELECTRO-OXIDATION OF PHOTOGRAPHIC SOLUTIONS

The invention concerns a method for the treatment by electrolysis of used photographic developers in order to degrade them and eliminate the components contributing to a high chemical oxygen demand (COD). The invention concerns more particularly the electro-oxidation of developers for X-ray products.

U.S. Pat. No. 5,160,417 and its division U.S. Pat. No. 5,277,775 describe a system for the treatment of photographic effluents comprising developers, bleaching baths and fixing baths. These three types of effluent are treated in different areas. Example 1 concerns the treatment of effluent containing a developer. After having been diluted 10 times, and its pH adjusted to 10 using soda, this effluent is subjected to electrolysis in a cell containing a platinum anode and a stainless steel cathode. Then, by adding barium hydroxide, the sulphate that has formed is eliminated. The COD falls from 68,000 ppm to 36 ppm, i.e. a reduction of 99%. Drawbacks of this method are the need to dilute the effluents and to have an additional desulphating step after electrolysis.

U.S. Pat. No. 3,998,710 describes a method for the electro-oxidation of photographic effluents comprising a mixture of a developer and at least 10% of fixer after the silver has been recovered therefrom. The problems encountered in the electrolysis of these mixtures of developers and fixers are due principally to the presence of ammonium thiosulphate used as a fixing agent. In this method, electrolysis is carried out with a platinum anode and stainless-steel cathode, by adding one of the mixture of ions chloride/carbonate, chloride/carbonate/iodide or chloride/carbonate/iodate to the solution, and at a pH between 4 and 10 by adding soda throughout the electrolysis. If the starting pH is below 4, a large quantity of sulphur forms through the oxidation of the thiosulphate contained in the fixer, and there is corrosion of the cathode and generation of chlorine. If the pH is above 10, ammonia is released, the viscosity of the electrolyte rises and numerous bubbles form, thereby slowing the degradation of the effluent and making it difficult to implement the method. This method enables a 99% reduction in the COD to take place over 20 hours. This method does not apply to photographic solutions containing only developers.

There are numerous problems and drawbacks associated with methods for the electro-oxidation of photographic effluents comprising numerous active chemical compounds and having a high COD, such as those containing photographic or X-ray developers. A first problem is the corrosion of most of the electrodes during electrolysis. Thus, with platinum-based electrodes, which are those most commonly used since they have good resistance to corrosion, some of the platinum is found in the solutions discharged into the environment. In practice, after electrolysis, the concentration of platinum in solution is high enough for it to be necessary to recover the platinum from the solution, through post-treatment or continuously, for reasons of cost and in order to limit the quantity of platinum in the effluents.

Another problem associated with the electro-oxidation of photographic effluents is the formation of a copious foam during electrolysis. This problem is particularly noticeable with effluents having a COD of more than 20 g/l. This problem becomes very troublesome during the treatment of developers for X-ray films, which can have a COD of more than 110 g/l and which require high current densities to be used in order for the period of electrolysis to remain reasonable.

This foam results from the presence of compounds extracted from the photographic or X-ray product during development and the Gases emitted during electrolysis (essentially hydrogen and oxygen). It leaves solid residues, which are deposited in the equipment and can clog it up. It is then necessary to use an electrolysis cell having sufficient dead space to contain the foam, or to use large quantities of anti-foaming agent in order to limit the formation of foam. But it is desirable to reduce to a minimum the addition of anti-foaming agent, since this is an organic product which participates in the COD and whose presence has a secondary effect of increasing the quantity of platinum in solution.

Thus one of the objects of the present invention is to reduce the addition of anti-foaming agent used to avoid the formation of foam during the electro-oxidation of photographic effluents having a high COD in an electrolysis cell comprising at least one platinum anode and at least one cathode.

This problem is resolved with the method in which an aqueous solution comprising used photographic or X-ray developers is subjected to electro-oxidation in a single compartment electrolysis cell comprising at least one platinum anode and at least one cathode, characterised in that the density of the electrolysis current applied at the start of electrolysis does not exceed 50% of the maximum density of the electrolysis current.

"Start of electrolysis" is intended to mean "for at least 10% of the time needed in order to obtain a COD of 2 g/l". The electrolysis time at a low current density should, however, be as short as possible, so as not to prolong the duration of the electrolysis. In practice, it is between 10% and 20% and preferably between 10% and 15% of the time needed in order to obtain a COD of 2 g/l. This time can be determined in each case by an expert, depending on the solution subjected to electro-oxidation.

Surprisingly, when only the start of electrolysis is carried out with a low current density, the duration of the electrolysis is not increased substantially and the quantity of foam is low. The addition of anti-foaming agent can then be reduced or eliminated. An increase in the quantity of platinum dissolved in the solution is thus avoided.

BRIEF DESCRIPTION OF THE DRAWINGS

In the description that follows, reference will be made to the following figures.

In the invention, the photographic solutions subjected to electro-oxidation contain black and white or color developers. The invention concerns, more particularly, solutions containing developers having a very high COD, which can be greater than 110 g/l, such as developers for X-ray films. These developers comprise hydroquinone, diethylene glycol, phenidone, glutaraldehyde, acetic acid, complexing agents, sulphite and bases.

The current density profiles that are useful according to the invention are those in which the current density is relatively low at the start of electrolysis, then rapidly reaches the maximum value and remains constant thereafter.

By way of indication, the value of the low current density applied for at least 10% of the time needed in order to obtain a COD of around 2 g/l is between 4 and 6 A/dm$^2$. The passage from this low value to the maximum value can be abrupt, but it is preferably made in stages, or gradually over a relatively short time, between 10% and 20% of the time needed in order to obtain a COD of around 2 g/l. A level stage at a current density of between 9 and 11 A/dm$^2$ can, for example, be envisaged. The electrolysis is then continued, by applying the maximum current density of between 12 and 20 A/dm$^2$. The total duration of the electrolysis in order to obtain a COD of around 2 g/l under these conditions does not exceed 8 hours.

According to the invention, anti-foaming agents can be used as non-ionic surfactants, such as those from the Pluronic® series, and preferably Pluronic-31R1 Polyol® (a sequenced copolymer of polyethylene oxide and polypropylene oxide in solution in methanol) marketed by BASF. However, in the present invention, if an anti-foaming agent is used, this is in the minimum quantity necessary in order to avoid the formation of foam. This quantity varies according to the efficacy of the anti-foaming agent and according to its concentration. For example, under the conditions of the invention, the quantity of Pluronic-31R1 Polyol® anti-foaming agent used pure, is less than or equal to 0.15 ml per liter of effluent to be treated, instead of 1 ml/l when all the electrolysis is carried out with a constant maximum current density.

Preferably, at the start of electrolysis, 30 to 50% of water is added to the photographic solution in order to compensate for losses occurring during electrolysis. This addition of water prevents the concentration of the solution with salts and the deposition of salts in the cell.

The method and the device according to the invention will be explained on the basis of the embodiment in FIGS. 1 and 2.

The solution of developers which forms the electrolyte circulates in a closed loop in the installation. The electrolyte is initially present in its totality in the expansion vessel (3). The circulation of electrolyte between the electrolysis cell (1) and the expansion vessel (3) is obtained by means of the peristaltic pump (2).

Figure 1:
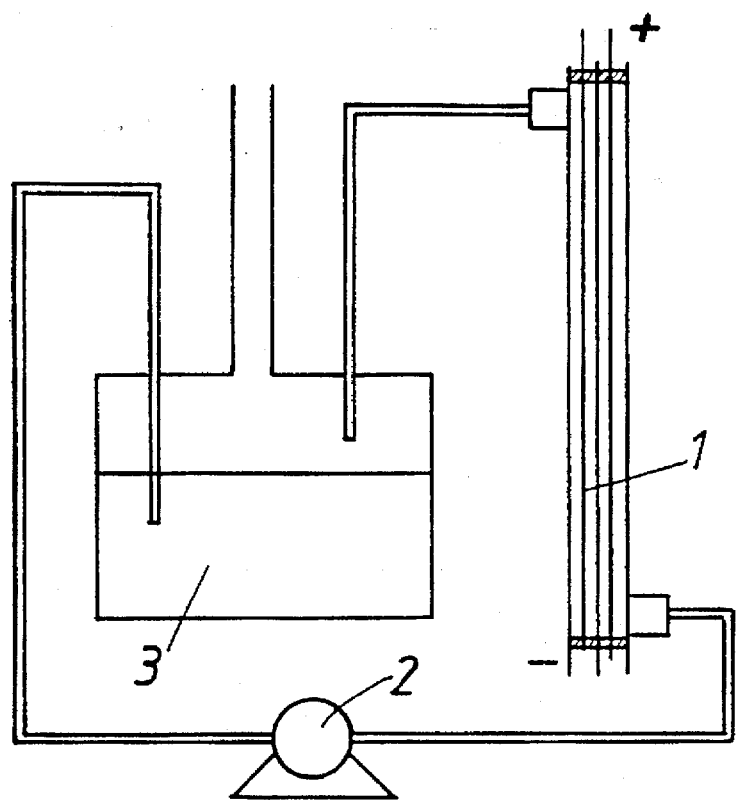
FIG. 1, which depicts diagrammatically the device used for the electro-oxidation, comprising a closed electrolysis cell.

According to one embodiment, the electrolysis cell is a closed cell, depicted in FIG. 1, comprising several platinum anodes and several titanium or stainless steel cathodes mounted alternately as a filter press and separated from each other by insulating joints. Preferably, the number of cathodes is one unit greater than the number of anodes. The circulation of electrolyte is parallel to the electrodes and takes place from bottom to top.

Figure 2:
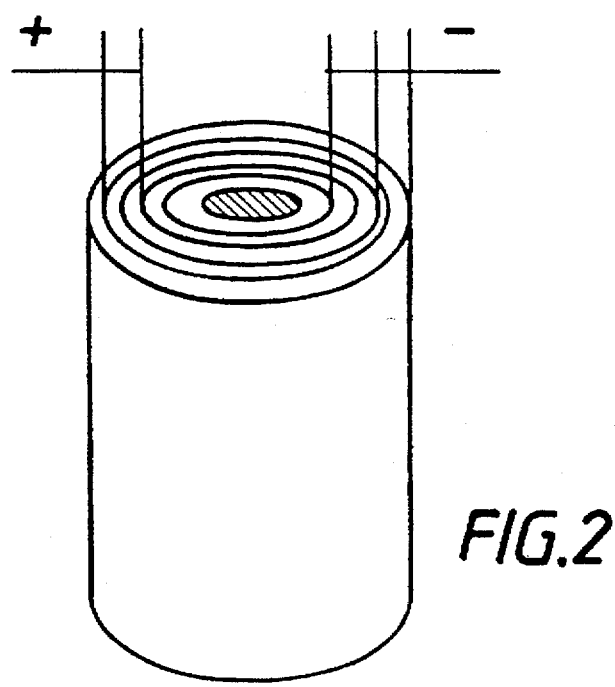
FIG. 2, which depicts an open electrolysis cell.

According to another embodiment, the electrolysis cell is an open cell, depicted in FIG. 2, comprising coaxial electrodes made of expanded metal. The anodes are made of platinum and the cathodes are made of titanium or stainless steel. The circulation of the electrolyte takes place from bottom to top and through the electrodes.

The expansion vessel allows storage and variations in the volume of the electrolyte. It is provided with a double jacket which prevents the temperature of the electrolyte from exceeding 40° C. The anti-foaming agent, if used, is introduced into the expansion vessel, preferably at the start of electrolysis.

At the outlet from the expansion vessel, there is a device (not shown) for trapping the volatile organic compounds (VOC) and the halogenated organic compounds (VOX) formed during electrolysis, such as a cartridge containing an adsorbent substance, for example activated carbon. A refrigerant can be added to the expansion vessel in order to limit the evaporation and entrainment of the volatile compounds.

An air inlet in the expansion vessel (not shown) enables the gases presenting a risk of explosion (hydrogen and oxygen) to be diluted before their release into the atmosphere.

Finally, the solution after electrolysis still contains residual quantities of metals originating from the anode, which are recovered by passing adsorbents, chelating agents or ion-exchanging resins over a cartridge (not shown).

EXAMPLES

Example 1

In this example, the electrolysis of RP X-OMAT® developer for the processing of films for medical X-ray, is carried out with different current density profiles.

The initial COD of the RP X-OMAT® developer is 126 g/l. The closed electrolysis cell comprises 2 anodes and 3 cathodes mounted alternately as a filter press, with a distance between the electrodes of 2.5 mm at most. The outer cathodes are titanium cathodes in the form of plates and the central cathode is a titanium cathode made of expanded metal. The anodes are SHOWA® titanium anodes covered with pure platinum in the form of expanded metal. The total working surface area of the electrodes is 10.5 dm$^2$. The electrolyte circulates parallel to the electrodes. This electrolysis cell enables a volume of solution of between 0.4 and 2 liters to be treated.

The developer coming from the expansion vessel is sent into the cell at a rate of 1000 ml/min. The temperature of the electrolyte is held below 40° C. 0.15 ml/l of pure Pluronic-31R1 Polyol® anti-foaming agent is introduced at the start of electrolysis.

Figure 3:
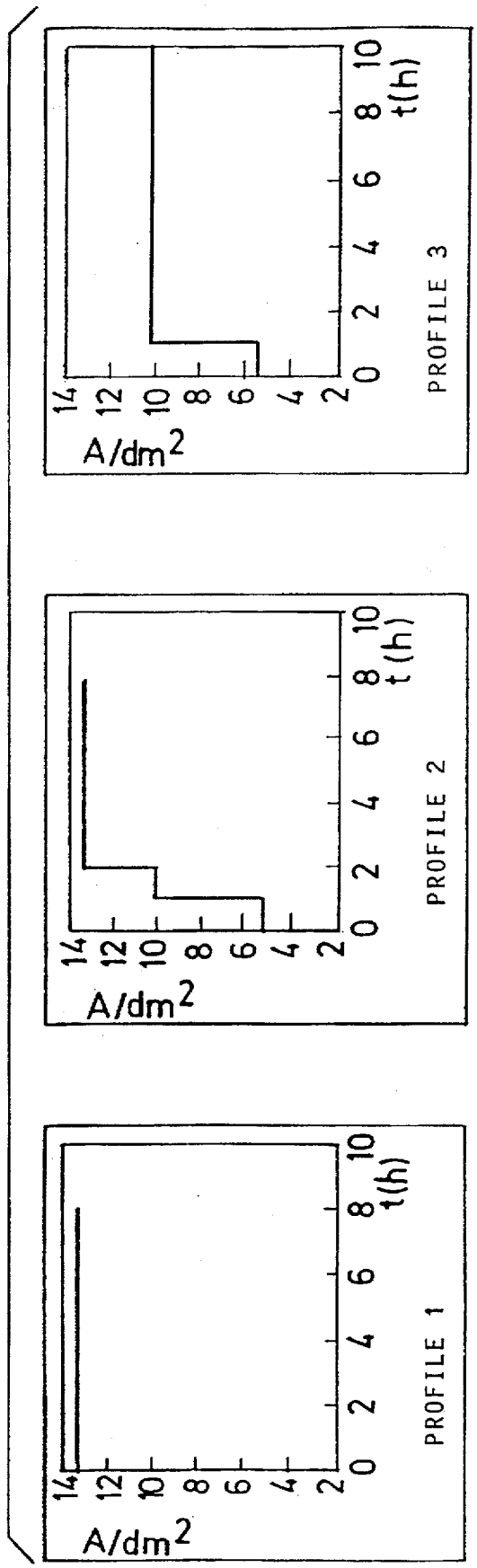
FIG. 3, which depicts current density profiles as a function of electrolysis time.
Figure 3:
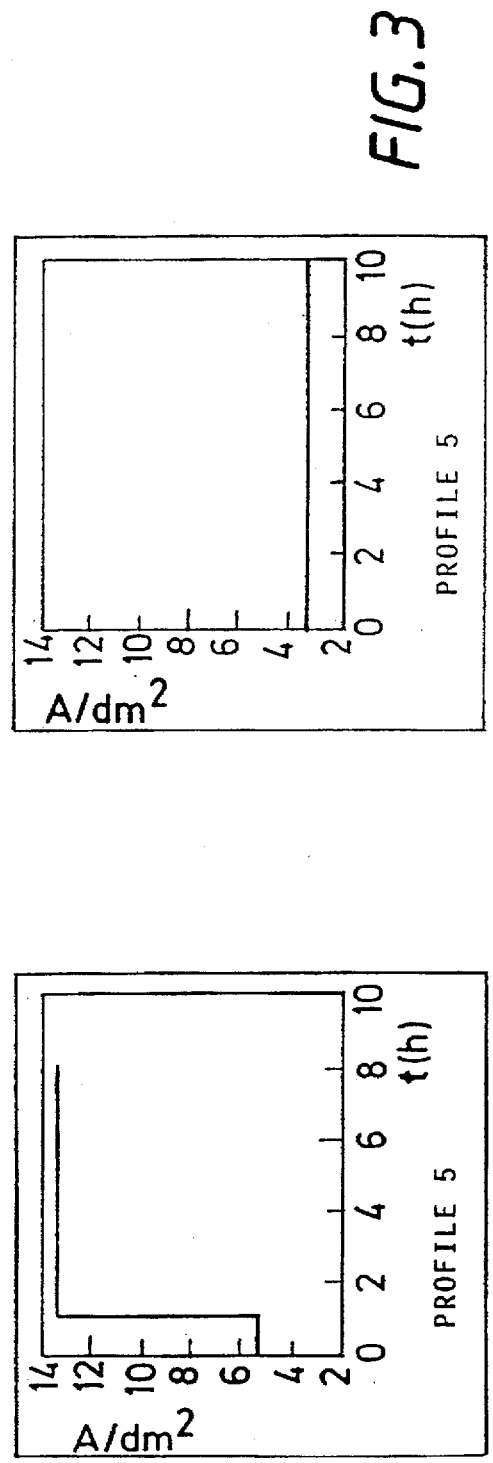

The electrolysis is carried out in galvanostatic mode, and the current intensity varies in accordance with the current density profiles in FIG. 3. The corresponding voltage is left free at around 4 to 5 volts.

FIG. 3 depicts the current density as a function of time. The current density profiles which limit the formation of foam are current density profiles Nos 2, 3, 4 and 5. Current density profile No 1 causes a very copious foam to be formed.

Figure 4:
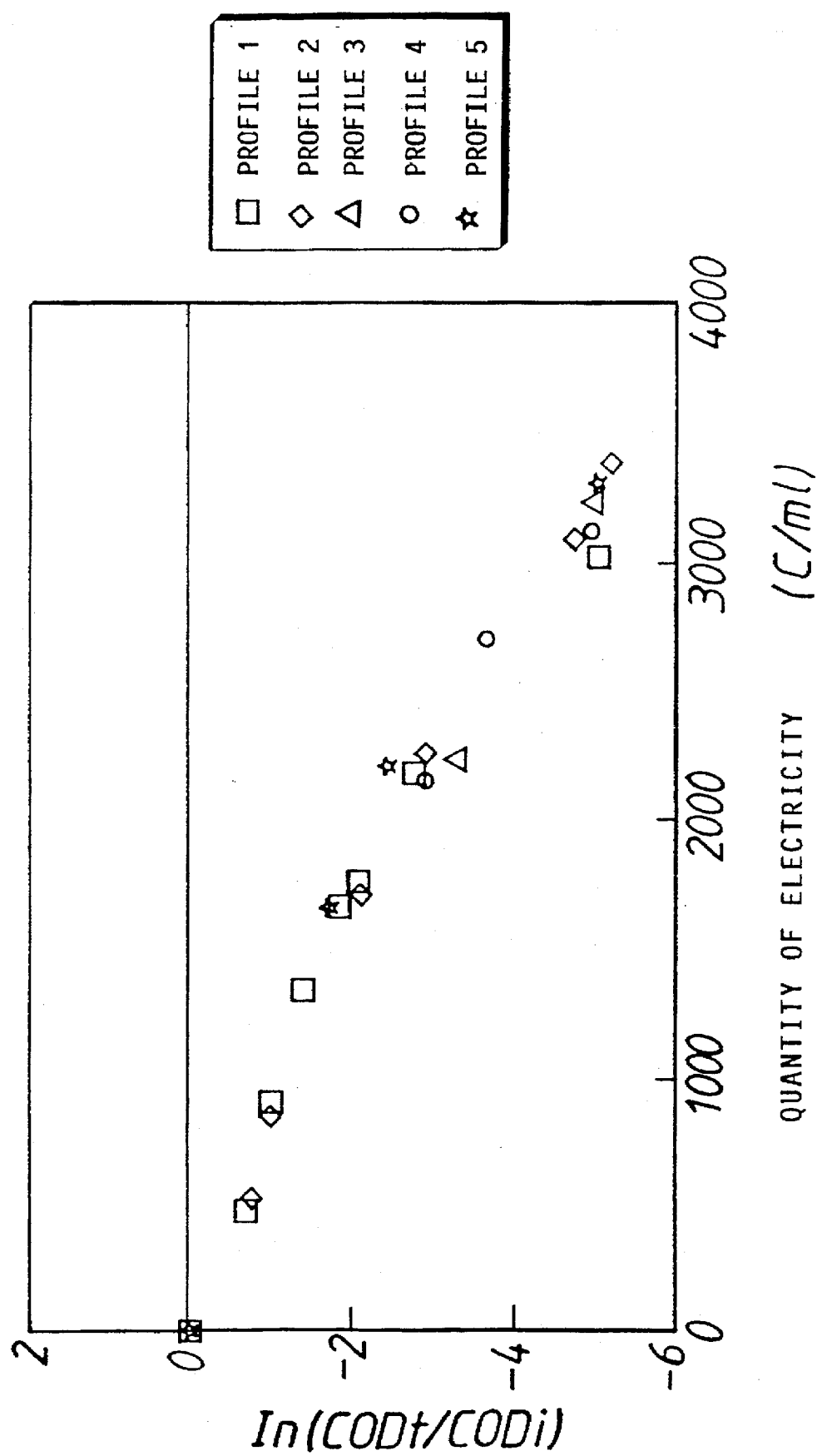
FIG. 4, which depicts the reduction in the COD of the developer RP X-OMAT® as a function of the quantity of electricity for the current density profiles in FIG. 3.

FIG. 4 shows the reduction in the COD expressed as a natural logarithm of the ratio of the instantaneous COD to the initial COD ($COD_t/COD_i$) as a function of the quantity of electricity in coulombs per milliliter of solution. It can be seen that, in order to obtain identical CODs, equivalent quantities of electricity must be used, whatever the current density profile used.

Figure 5:
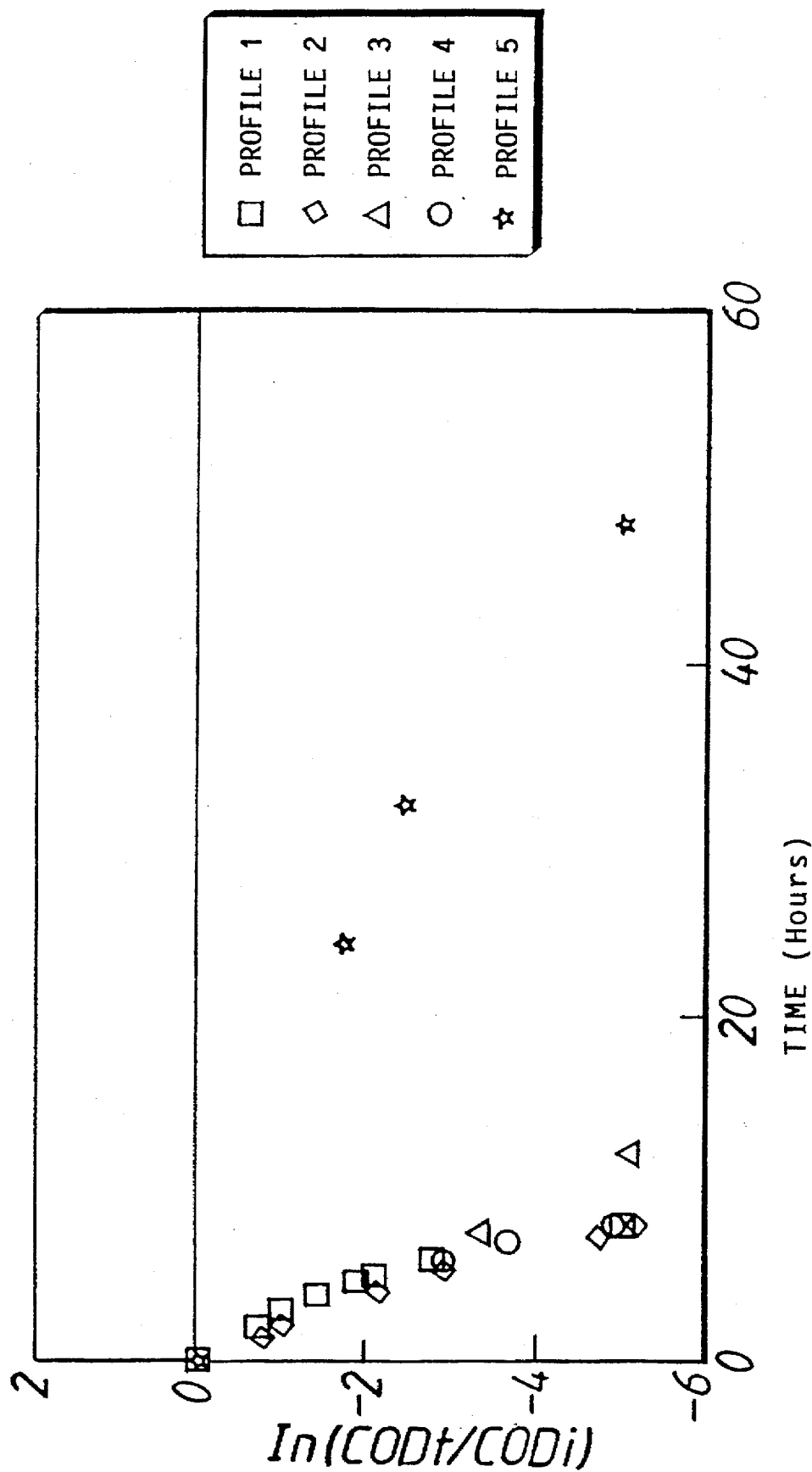
FIG. 5, which depicts the reduction in the COD of RP X-OMAT® developer as a function of time for the current density profiles in FIG. 3.

It can be seen in FIG. 5 that, for current density profiles Nos 1, 2 and 4, the duration of electrolysis is practically the same. Current density profiles No 3 and 5 correspond to a longer electrolysis time, which is unacceptable in the case of current density profile No 5, since it is in excess of 50 hours.

Example 2

In this example, the procedure is the same as in Example 1, except that the RP X-OMAT® developer is replaced by the developer RA-30® used in rapid processing for X-ray films. The initial COD of the RA-30® developer is 118 g/l.

Figure 6:
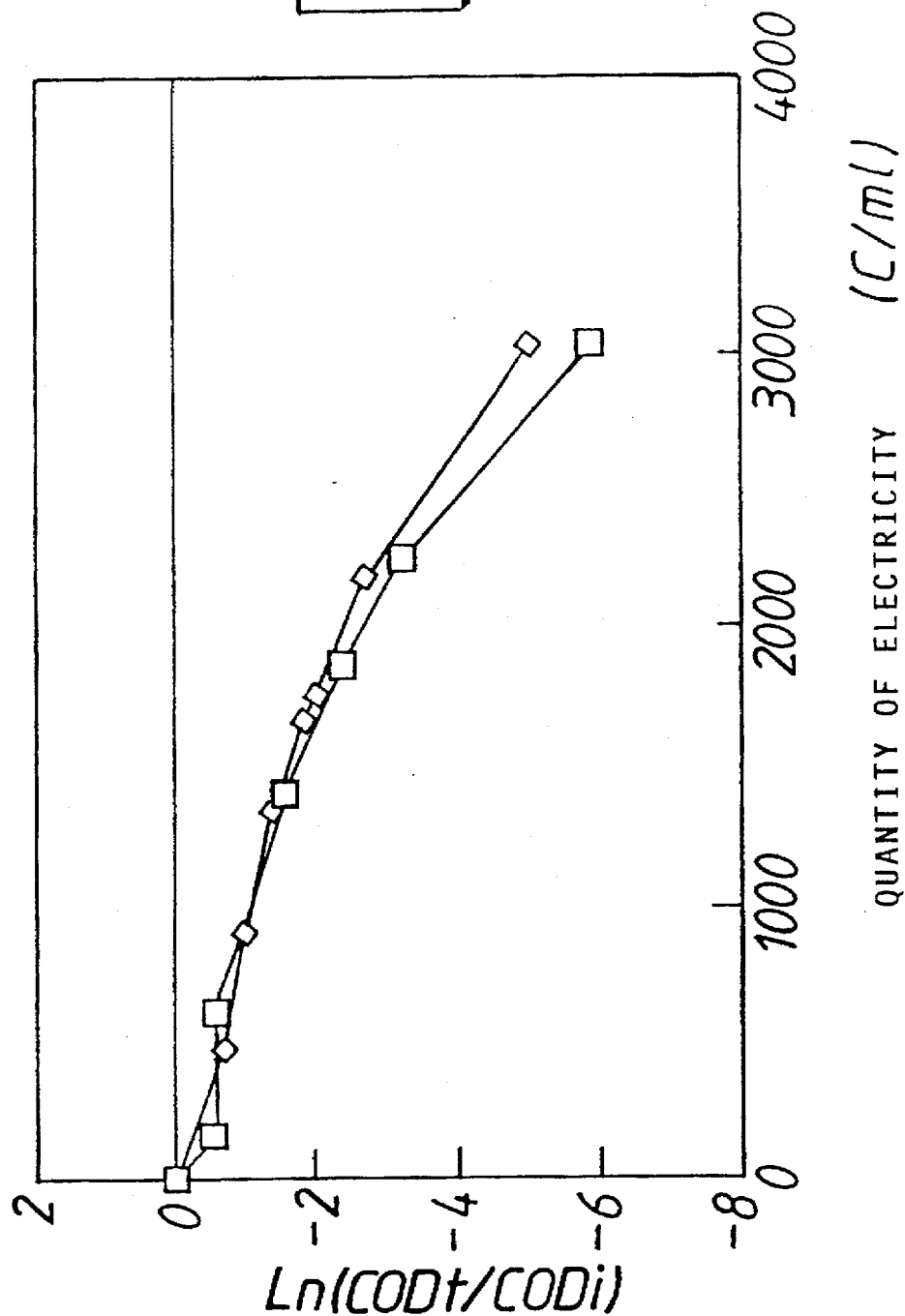
FIG. 6, which depicts the comparative reduction in the COD as a function of time for current density profile No 2 for the developers RP X-OMAT® and RA30®.

FIG. 6 depicts the reduction in the COD as a function of time when current density profile No 2 is used for the RP X-OMAT® and RA30® developers. It can be seen that the results for the reduction in COD are very similar for the two developers.

Example 3

In this example, the quantity of anti-foaming agent needed in the case of current density profile No 1, where the operation is continuous at the maximum current density, is compared with current density profile No 2 according to the invention, these two profiles being depicted in FIG. 3.

In order to prevent the formation of foam, at least 1 ml/l of Pluronic-31R1 Polyol® anti-foaming agent needs to be used with current density profile No 1, where the operation is carried out at a constant current density of 13.6 A/dm$^2$ over 8 hours. The quantity of platinum in solution at the end of electrolysis is 76 mg/l.

In the case of current density profile No 2, the operation is carried out with a current density of 5.33 A/dm$^2$ over 1 hour, then of 10 A/dm$^2$ over 1 hour, then of 13.6 A/dm$^2$ over 6 hours. In order to prevent the formation of foam, only 0.15 ml/l of Pluronic-31R1 Polyol® anti-foaming agent needs to be used. The quantity of platinum in solution at the end of the electrolysis is 45 mg/l.

This example shows that the current density profiles according to the invention enable the addition of anti-foaming agent, and consequently the quantity of platinum in solution, to be limited.

Example 4

In this example, the electrolysis of the RP X-OMAT® developer is carried out with an open electrolysis cell and a closed electrolysis cell.

The closed electrolysis cell is that used in Example 1. It enables 1.19 l of solution to be treated. The flow rate of the solution is 1000 ml/min.

The open electrolysis cell comprises 5 coaxial electrodes made of expanded metal, 2 anodes and 3 cathodes. The total working surface area of the electrodes is 7.5 dm$^2$. It enables 0.85 l of solution to be treated. The circulation of the electrolyte takes place from bottom to top. The flow rate of the solution is 1000 ml/min.

In both cases, the duration of the electrolysis is 8 hours, the quantity of electricity in relation to the volume of solution to be treated is identical and the current density profile is profile No 2.

Figure 7:
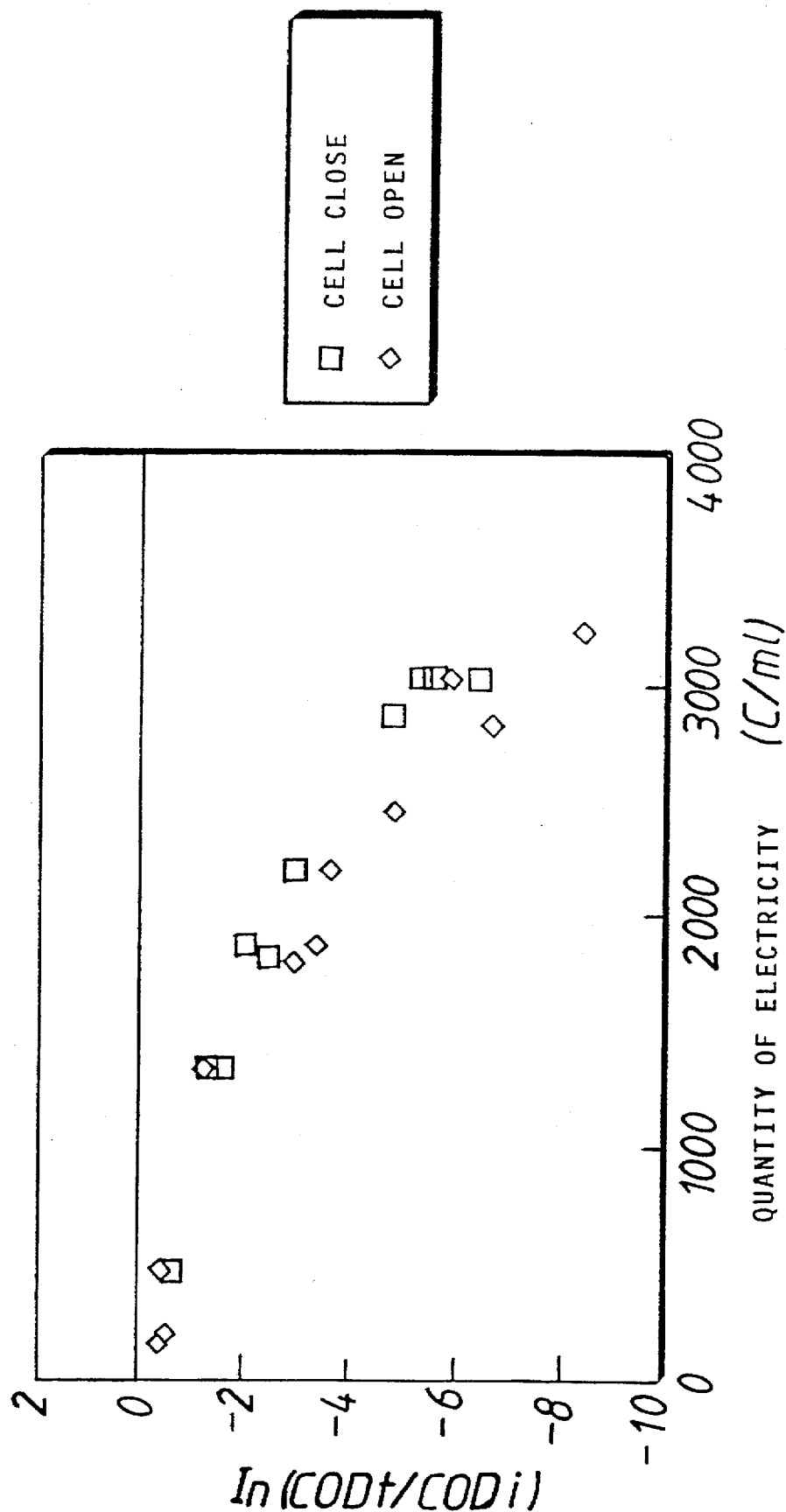
FIG. 7, which depicts the comparative reduction in the COD of RP X-OMAT® developer as a function of time with an open electrolysis cell and with a closed electrolysis cell.

FIG. 7 depicts the reduction in the COD of the RP X-OMAT® developer as a function of time, with the open electrolysis cell and the closed cell.

Very similar results are observed for both types of electrolysis cell. In both cases, the reduction in COD is greater than 99% (Ln COD$_f$/COD$_i$=−4.6) for a quantity of electricity of 2500 C/ml.

This example shows that an open or closed cell can equally well be used. The closed cell has the advantage of preventing overflowing of solution, limiting water evaporation, and therefore salt concentration, and enabling the electrolysis gases to be recovered safely.

I claim:

1. Method for electro-oxidizing an aqueous solution having a COD higher than 20 g/l comprising used photographic or X-ray developers in a single compartment electrolysis cell comprising at least one platinum anode and at least one cathode, wherein the method comprises electro-oxidizing the aqueous solution at a first current density applied at the start of electrolysis for a time period of from 10% to 20% of the time needed to obtain a COD of 2 g/l, said first current density not exceeding 50% of the maximum density of the electrolysis current applied during electro-oxidation, and then increasing the current density up to the maximum current density.

2. Method according to claim 1, in which the maximum density of the electrolysis is between 12 and 20 A/dm$^2$.

3. Method according to claim 1 in which the first current density is between 4 and 6 A/dm$^2$, then the current density is increased abruptly to reach a maximum value between 12 and 20 A/dm$^2$, and is maintained constant thereafter.

4. Method according to claim 1 in which the first current density is applied for 10% of the time needed in order to obtain a COD of 2 g/l and is between 4 and 6 A/dm$^2$, then the current density is increased progressively or in stages, for 10% to 20% of the time needed in order to obtain a COD of 2 g/l, to reach a value between 12 and 20 A/dm$^2$, and is maintained constant thereafter.

5. Method according to claim 4, in which after the first current density is applied, the current density is increased to between 9 and 11 A/dm$^2$ for 10% to 20% of the time needed in order to obtain a COD of 2 g/l, then the current density is increased to a maximum value between 12 and 20 A/dm$^2$, and is maintained constant until the end of electrolysis.

6. Method according to claim 1, in which electrolysis is carried out in an open cell, comprising concentric platinum anodes and titanium or stainless steel cathodes.

7. Method according to claim 1, in which electrolysis is carried out in a closed cell, comprising a stack of platinum anodes and titanium or stainless steel cathodes.

8. Method according to claim 1, in which water is added to the photographic solution at the start of electrolysis in order to compensate for losses occurring during electrolysis.

* * * * *